Patented Sept. 5, 1939

2,172,025

UNITED STATES PATENT OFFICE 2,172,025

MANUFACTURE OF ETHYLENE OXIDE

Herbert Langwell, Epsom, and Herbert Muggleton Stanley, Tadworth, England, assignors to The Distillers Company Limited, Edinburgh, Scotland, a British company No Drawing. Application January 27, 1938, Serial No. 187,314. In Great Britain February 17, 1937

5 Claims. (Cl. 260—348)

This invention relates to the manufacture of ethylene oxide by extracting it from a gas mixture by means of active carbon, as adsorbent, and then recovering the adsorbed ethylene oxide from the carbon. Such a gas mixture results for example from the oxidation of ethylene to ethylene oxide, and may contain about 1 to 6 percent of ethylene oxide together with carbon dioxide, water vapour, and permanent gases. The recovery may be effected by treating the carbon containing the ethylene oxide with a hydrocarbon such as benzene and/or a halogenated hydrocarbon such as carbon tetrachloride or by means of wet steam.

In the case of adsorption by activated carbon in many operations, such as in the recovery of acetone or benzene or butyl alcohol from gas mixtures, the carbon can be used again and again after being desorbed and given a preliminary drying as by means of hot air or inert gases. A moderate degree of drying is sufficient for such purposes because any inefficiency in this respect shows itself merely as a drop in the adsorbing capacity of the carbon and moreover any marked inefficiency during any one absorbing operation may be corrected during some subsequent drying operation by a somewhat more effective drying.

In the case however of using activated carbon for ethylene oxide recovery from gas mixtures the degree of dryness of the carbon is surprisingly important. This is due to the danger of ethylene glycol formation by hydrolysis of the ethylene oxide. As already mentioned there may be some water vapour in the gas mixture undergoing adsorption and moreover saturated steam may be used as the desorbing agent. The tendency to ethylene glycol formation is so great that it might be supposed that activated carbon actually has a catalytic action in such formation.

Not only does the ethylene glycol constitute a loss of ethylene oxide and not only does it poison or deteriorate the carbon but it does so in a particularly harmful way because it is relatively permanent and accelerates further formation. The poisoning of activated carbon by ethylene glycol and possibly by resinous condensation products is so serious that if allowed to form owing to incomplete drying, the carbon needs to be boiled in water for many hours. Consequently the drying must be extremely thorough after every desorption.

We have found and have explained in the specification of our co-pending patent application Serial No. 112,081 that the desorbed carbon should be dried every time by means of hot air or inert gas to such a degree and under such conditions that no appreciable amount of desorbed water is detectable in the effluent gas. A satisfactory way of determining the degree of drying is to continue the flow of hot air or inert gas through the carbon until the outflow gas temperature is substantially the same as the inflow temperature. The inflow temperature is of course adequate to carry off the water-vapour, say 120° C. to 250° C.

After being dried, the hot carbon is cooled either directly by cold air or other inert gas or indirectly by internal cooling coils, or by both methods, after which adsorption can be resumed.

The adsorption period can continue until the presence of ethylene oxide is detected in the outflowing gases, whereupon the desorbing, thorough drying, and cooling operations are repeated.

However even when the conditions above-mentioned are observed we have found that the adsorptive power of the carbon tends to decline on prolonged use and the chief object of the present invention is to revivify the partially inactive carbon completely after repeated use. A further object is to effect the revivification by a simple and inexpensive treatment.

According to the present invention ethylene oxide contained in a gas mixture is removed therefrom by being adsorbed in active carbon and the adsorbed ethylene oxide is recovered at intervals from the carbon, and the carbon after each use and desorption is thoroughly dried to a predetermined degree preparatory to re-use, and finally the carbon having become partially inactive by prolonged use is completely revivified by treatment with hot or boiling water or a suitable water-miscible solvent or a mixture of such solvent and water for a substantial period of time e.g. half an hour or more to cleanse and reactivate the carbon so that after thorough drying it is ready for re-use in its revivified state. Suitable solvents are aliphatic alcohols such as ethyl alcohol, isopropyl alcohol or propyl alcohol.

Example.

Active carbon which initially was capable of adsorbing 80 grams per litre from a gas mixture containing 4–5% of ethylene oxide was so impaired in quality after being used 50 times that its adsorptive power had dropped to 65 grams per litre.

It was then treated with sufficient water to cover it completely and was maintained for 24 hours at a temperature of about 90° C. The water was thereafter removed and the carbon was thoroughly and completely dried. After this revivifying treatment the adsorptive power of the carbon was 85 grams per litre.

What we claim is:

1. In a process of manufacturing ethylene oxide by oxidation of ethylene the steps of removing the ethylene oxide from the remaining oxidation products by adsorption in active carbon, treating the carbon for the removal of the adsorbed ethylene oxide therefrom, drying the carbon to make it fit for re-use and repeating the foregoing operations until the carbon has become partially inactive, and then revivifying the partially inactive carbon by treating it with hot water for a prolonged period, and finally removing the said carbon from the water and completely drying it.

2. In a process of manufacturing ethylene oxide by oxidation of ethylene the steps of removing the ethylene oxide from the remaining oxidation products by adsorption in active carbon, treating the carbon for the removal of the adsorbed ethylene oxide therefrom, drying the carbon to make it fit for re-use and repeating the foregoing operations until the carbon has become partially inactive, and then revivifying the partially inactive carbon by submerging it in water, maintaining the temperature thereof at about 90° C. for about 24 hours, removing the water from the carbon, and completely drying the carbon.

3. In a process of manufacturing ethylene oxide by oxidation of ethylene the steps of removing the ethylene oxide from the remaining oxidation products by adsorption in active carbon, treating the carbon for the removal of the adsorbed ethylene oxide therefrom, drying the carbon to make it fit for re-use and repeating the foregoing operations until the carbon has become partially inactive, and then revivifying the partially inactive carbon by treating it for a prolonged period with an agent taken from the group consisting of hot water, boiling water, an aliphatic alcohol and a mixture of water and said aliphatic alcohol, and finally separating the agent and the carbon and completely drying the carbon.

4. In the process of manufacturing ethylene oxide by oxidation of ethylene, the steps of removing the ethylene oxide from the remaining oxidation products by adsorption in active carbon, treating the carbon for the removal of the adsorbed ethylene oxide therefrom by treatment with an agent taken from the group consisting of steam, hydrocarbons and halogenated hydrocarbons, drying the carbon to make it fit for re-use, and repeating the foregoing operations until the carbon has become partially inactive, and then revivifying the partially inactive carbon by treating it with hot water for a prolonged period, and finally separating the carbon and water and completely drying the carbon.

5. In the process of manufacturing ethylene oxide by oxidation of ethylene, the steps of removing the ethylene oxide from the remaining oxidation products by adsorption in active carbon, treating the carbon for the removal of the adsorbed ethylene oxide therefrom by treatment with an agent taken from the group consisting of steam benzene and carbon tetrachloride, drying the carbon to make it fit for re-use, and repeating the foregoing operations until the carbon has become partially inactive, and then revivifying the partially inactive carbon by treating it with hot water for a prolonged period, and finally separating the carbon and water and completely drying the carbon.

HERBERT LANGWELL.
HERBERT MUGGLETON STANLEY.